(12) United States Patent
Frohlund et al.

(10) Patent No.: US 6,421,547 B1
(45) Date of Patent: Jul. 16, 2002

(54) ARRANGEMENT AT A MOBILE TELEPHONE

(75) Inventors: Stig Frohlund, Hässleholm; Johan Nilén, Lund; Christer Thor, Katrineholm; Mats Thollander, Örebro, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/449,868

(22) Filed: Nov. 29, 1999

(30) Foreign Application Priority Data

Dec. 1, 1998 (SE) .............................................. 9804141

(51) Int. Cl.⁷ ................................................ H04B 1/38
(52) U.S. Cl. ......................................... 455/575; 455/90
(58) Field of Search ................................. 455/550, 575, 455/90, 347, 351; 361/814; 439/11, 13, 19, 31

(56) References Cited

U.S. PATENT DOCUMENTS 4,671,582 A    6/1987  Stromquist et al. ........... 439/31

FOREIGN PATENT DOCUMENTS

| EP | 0836308 | 4/1998 |
|----|---------|--------|
| WO | WO 9839942 | 9/1998 |

*Primary Examiner*—Thanh Cong Le
(74) *Attorney, Agent, or Firm*—Nixon & Vanderhye P.C.

(57) ABSTRACT

An arrangement in a cellular mobile telephone apparatus includes a protective hatch or flip pivotably arranged on a housing of the apparatus. The flip is pivotable around an axial compartment in the housing and is arranged to physically cover at least part of a front side of the housing. The axial compartment includes a hinge which provides a mechanical connection between the flip and the housing and permits an electrical connection between the microphone and the printed circuit board of the telephone. The electrical connection between the microphone and a printed circuit board in the telephone housing includes a first wiring that leads from the microphone to a first contact. This first contact is fixedly arranged in the ear of the flip. A second contact rotatable in a hole in the axial compartment is connected to a second wiring that leads from the second contact to the printed circuit board of the telephone. When the first and second contacts are fixedly connected, they move together when the flip cover is rotated.

20 Claims, 3 Drawing Sheets

ARRANGEMENT AT A MOBILE TELEPHONE

TECHNICAL FIELD OF THE INVENTION

The present invention relates to an arrangement at a cellular mobile telephone apparatus, comprising a protective hatch or flip pivotably arranged on a housing of said apparatus and comprising a microphone, said flip being pivotable around an axle through at least one ear of the flip (flip-ear) and arranged to physically cover at least parts of a keypad on said apparatus, whereby said axle comprises hinge means for providing a physical pivotable mechanical connection as well as establishing an electrical connection between the microphone and a printed circuit board of the telephone along said axle of pivot for the flip.

DESCRIPTION OF THE PRIOR ART

Mobile telephones provided with such a flip or a hatch, for covering a key pad thereon, have been used by certain manufacturers for some years. The main purpose with such a flip—being to protect said keypad from inadvertent manipulation—has been by some other manufacturers tackled electronically through the use of key pad locks, being initiated by inserting a certain code for using the keypad.

Mobile telephones have now, however, become so small that such a flip must be used for establishing the right distance between the earpiece and a sound receiving means, preferably a microphone. By this establishment the best possible fidelity of the sound registered by said microphone is achieved.

As a consequence an electrical connection has to be established between the flip the mobile telephone housing, which connection for obtaining and retaining a good and well functioning telephone is critical both from a use point of view, and an assembly point of view. The use aspects on the connection is among others that the connection should be able to outlive the operative lifetime of the telephone as a whole. Also a possibility for changing the flip as a whole need to be provided for. Further the connection has to be such that it can be easily and automatically assembled with common robots and related equipment.

In the prior art all kinds of suggestions have been brought forward, however, so far none being of a kind fulfilling the requirements mentioned above. As samples of this prior art PCT/US96/01563 assigned to Ericsson Inc. and EP 0 720 339 A2 can be mentioned.

None of these references comprises elements which either taken alone or combined would lead the man skilled in the art to the solution hereby presented.

The first mentioned reference describes a connector having a sliding contact contained in a hinge. The only matter this reference has in common with the invention is that it provides an electrical connection between the housing and the flip.

The secondly mentioned reference, like the first one, describes an electrical connection which takes up the relative motion in the connection inside the hinge. Difficulties assembling such a device, comprising several parts to be interconnected, makes this solution less or even not at all suitable for automatic assembly.

SUMMARY OF THE INVENTION

It is therefore an object of the present invention to provide a mobile cellular telephone apparatus with an electrical connection between a microphone contained in its flip, and a printed circuit board contained in its housing, which regarding reliability, serviceability and suitability for automatic assembly is superior compared to prior known arrangements for obtaining the same function.

To meet this object the electrical connection between the microphone and a printed circuit board of the telephone housing is divided into a first wiring length leading from the microphone to a first contacting means, fixedly arranged in the ear of the flip, and a second contacting means fixedly connectable to the first contacting means, and pivotably arranged along the axle in the housing, and from the end of the second contacting means on the inside of the housing, a second wiring length leading from the contacting means to the printed circuit board of the telephone.

According to another aspect of the present invention the microphone is flex-film soldered to the first wiring length. This arrangement is especially advantageous in connection with automatic assembly of the telephone.

Further, in a modified version, the unit comprising the microphone and the first wiring length also comprises a first contacting means. By this integration, automatic assembly becomes easier and certainly much safer from a quality point of view.

The first contacting means is according to a further aspect of the invention turntable arranged in an indentation in the housing, specifically designed for the purpose.

According to yet another aspect of the invention, the second wiring length is at its end opposite the second contacting means attached to the printed circuit board via a disconnectable contact means. The connection can thereby with certainty be obtained retaining the quality requirements, even when assembled automatically.

The second wiring length is within its extension limits freely translatable. The movement of the flip is thereby in full transferred into a translation in said wiring.

According to a modified embodiment the second wiring length is at least partly spirally wound. Thereby any risk of interference with parts inside the telephone is avoided.

As a further aspect of the invention the second contacting means has two knobs extending each in a radial direction perpendicular to the axle of the flip. These knobs has counterparts in the indentation of the housing for allowing insertion of the contacting means into the housing. The counterparts in the housing are preferably oriented such, that the knobs may penetrate the indentation of the housing only at a specific angle of 30° with regard to a plane parallel to the rear side plane of the telephone in its assembled state.

BRIEF DESCRIPTION OF THE DRAWINGS.

A preferred embodiment of the invention will be described in more detail below under reference to the enclosed drawings, in which.

DETAILED DESCRIPTION OF THE INVENTION.

Figure 1:
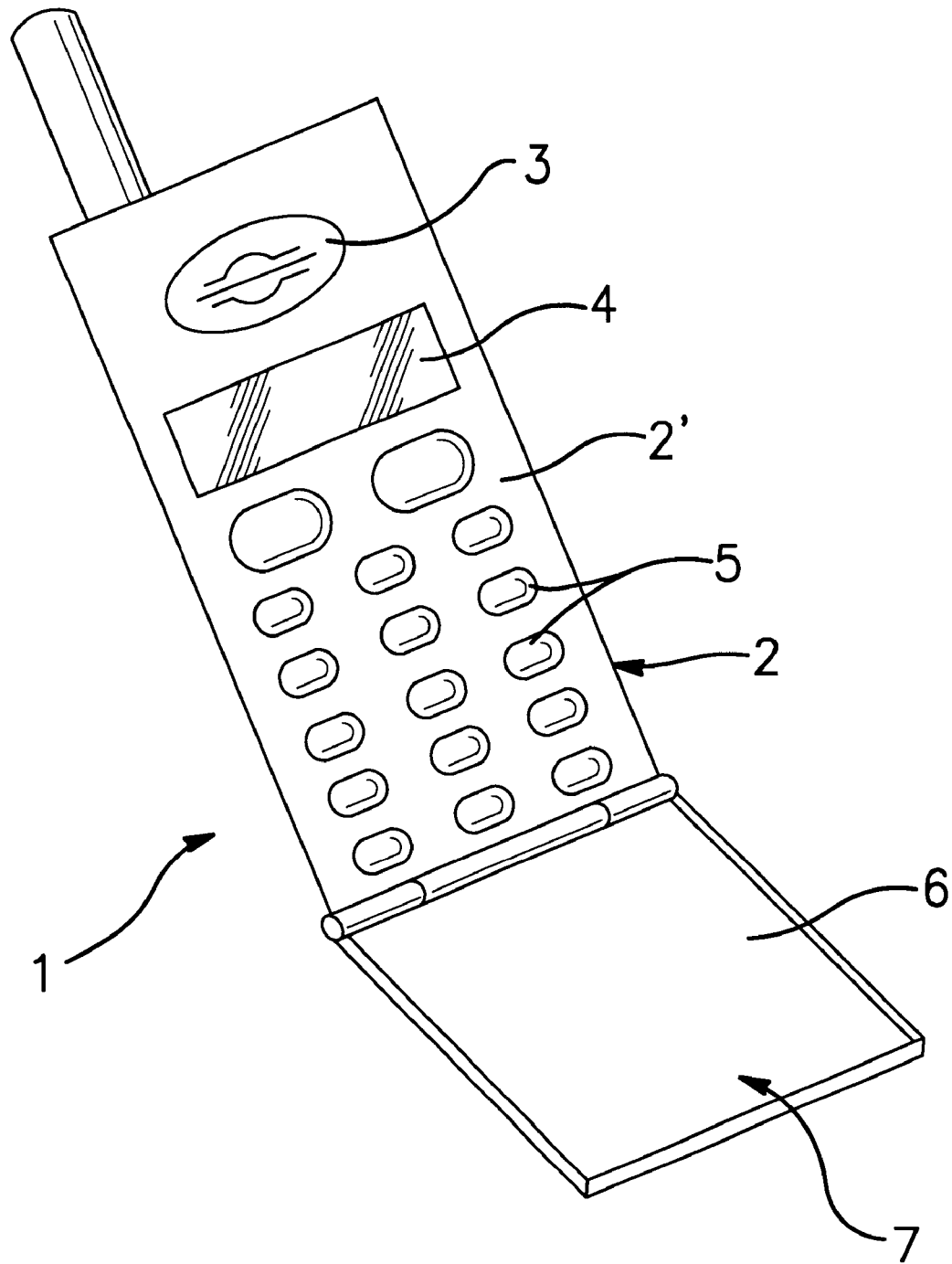
FIG. 1 is a general schematic perspective view of a mobile telephone in its assembled state, having a flip for protecting its keypad.

FIG. 1 shows a general schematical perspective view of a conventional mobile "flip type" telephone apparatus 1, including a housing 2, which at its front side 2' has an earpiece 3, a display-window 4, keypad-cavities/buttons 5 for dialling and functional purposes, such as "on/off", "send", "clear", and a flip 6 for protecting said buttons. In this specific embodiment provisions have been made for accommodating a microphone 7 in said flip 6.

Figure 2:
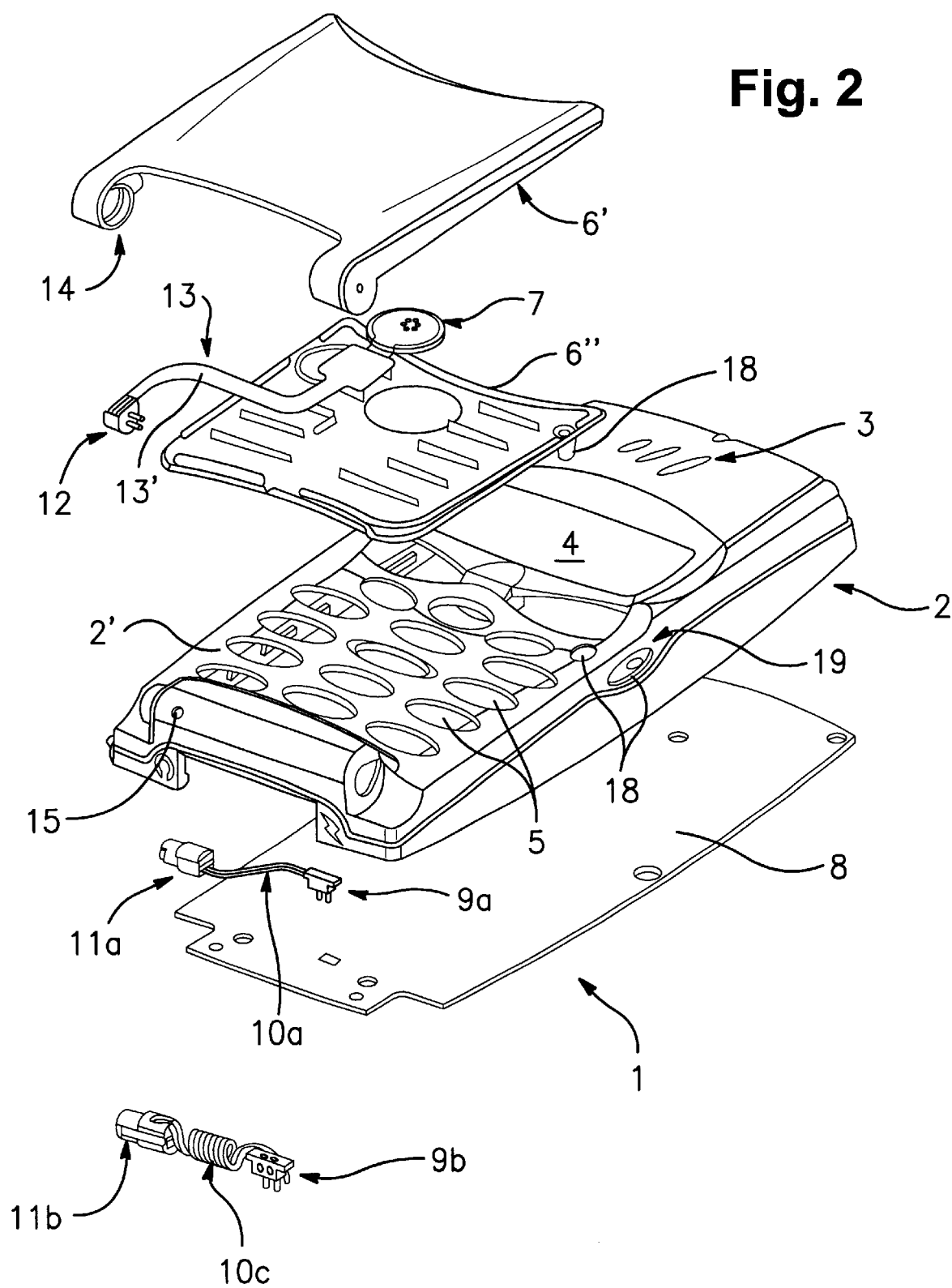
FIG. 2 is a general perspective view of relevant parts of a cellular mobile telephone in a spaced apart relationship.

FIG. 2 shows relevant parts of the mobile "flip type telephone in an exploded view, main features, like for instance the exact design of a PCB (Printed Circuit Board), not essential for the implementation of this invention, being excluded. A schematic PCB 8 is however shown including a contact 9a, 9b attached thereto, connected to a piece of wiring 10a, 10b (first wiring length), indirectly emanating from the microphone 7. The wiring 10a, 10b has at its outer end a connector 11a, 11b which in turn is to be connected to a connector 12 at the end an integrated microphone element 13. It should be noted that the differences occurring between the elements 9a, 9b and 11a, 11b respectively, are of no importance to the invention. The microphone element 13 comprises a flex-film element 13', onto which said microphone 7 is heat-soldered at one end. At the other end of said flex film element 13' said connector 12. is situated, supposed to, as mentioned above, be connected to the connector 12, thus completing the electric connection between the microphone 7 and the PCB 8.

As is obvious from FIG. 2, the flip 6 comprises two parts 6' and 6", between them fixedly sandwiching the microphone element (13), including its connector 12. In other words, the connector 12 is torsionally fixed to the flip 6. The torsional fixation is achieved by fixedly arranging the connector 12 in an ear 14 of the flip portion 6'. This means that the flip 6 with the microphone 7 and connector 12 constitutes a separate element, which easily can be replaced later on, if for same reason damaged. This is one of the prerequisites of the invention. Another is ease of mountability. The connector 12 is when it has been connected to the connector 11, working as a driver for the latter, which thereby, when it is in its mounted state, follows every move of the flip 6.

The connector 11, on the other hand, is pivotally arranged at one end of an axle compartment 15 at the bottom end of the front side 2' of the housing 2.

Figure 3:
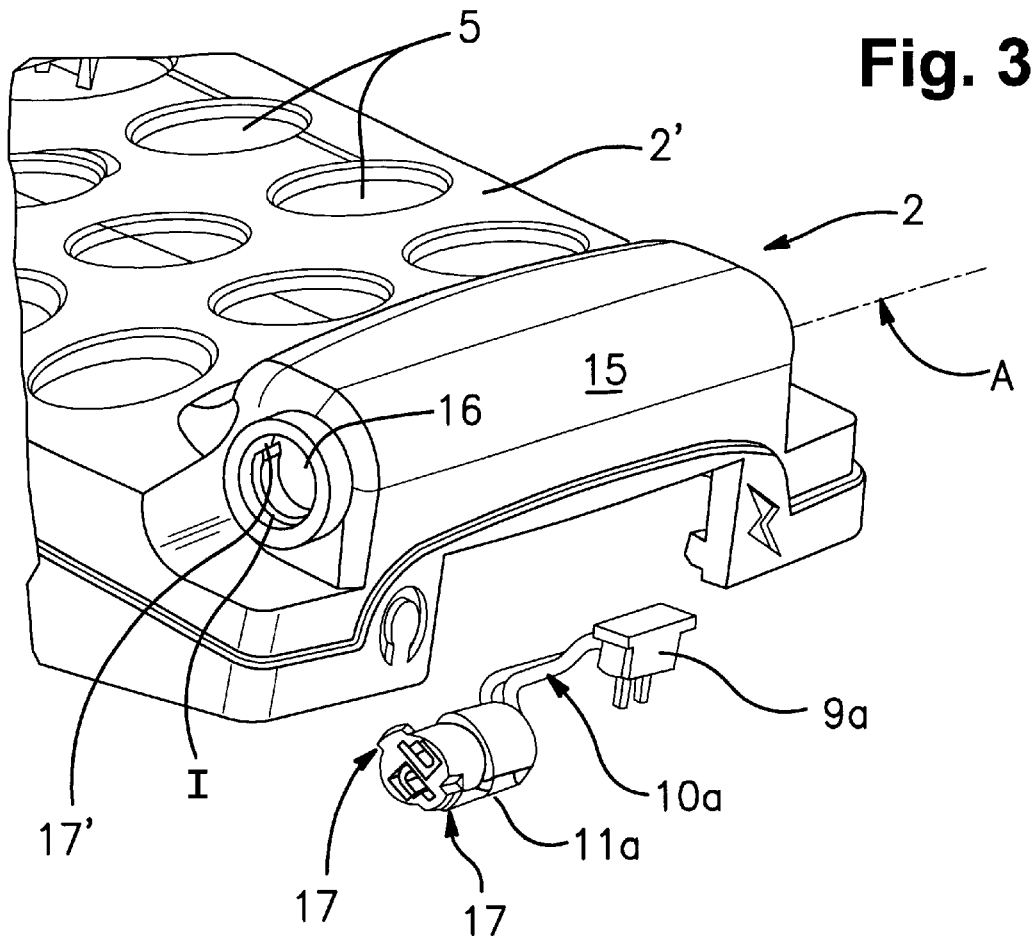
FIG. 3 is a more detailed perspective view of an electrical and mechanical connection portion.
Figure 4:
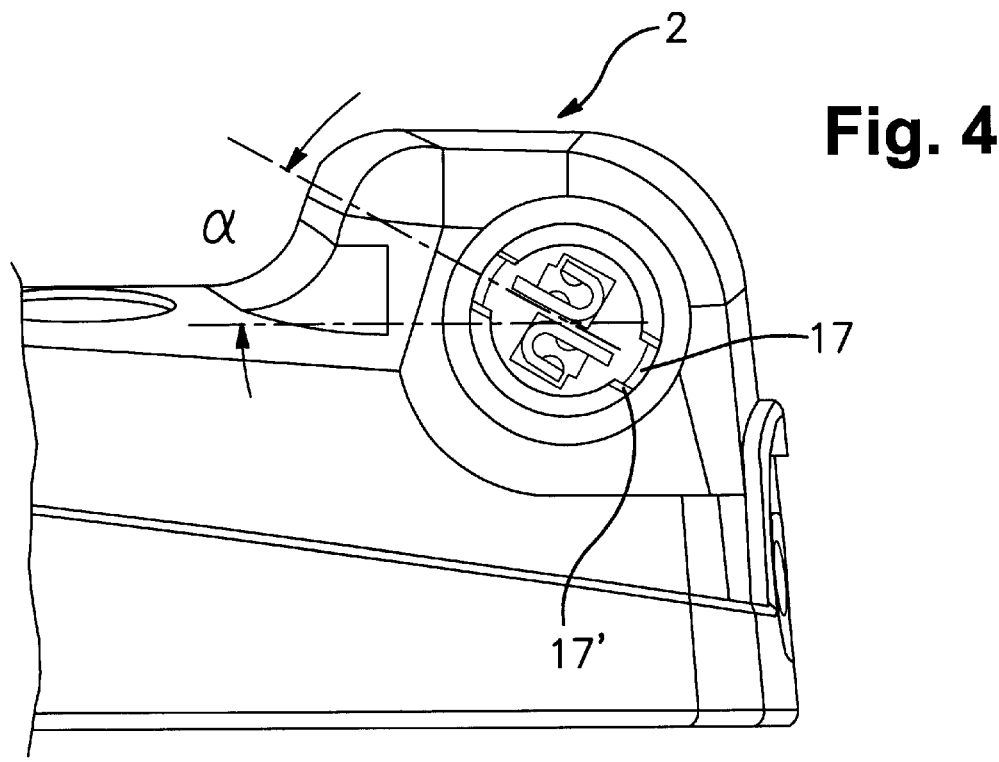
FIG. 4 is a side view of said connection portion with a second contacting means being visible through an indentation of the housing.

As can be seen from FIG. 3, the connector 11 is to be partially inserted into a hole 16 at the one end of the axle compartment 15. This hole 16 is designed to permit insertion of the connector 11 in only one position, namely in a position of the connector 11 which equals an opening-degree =30° of the flip 6 (See FIG. 4). This position is necessary to permit insertion of a couple of knobs 17 on the connector 11. In other words, in this position the part of the connector 11 to be inserted in the hole 16, exactly matches the design of the same. One reason for designing these co-operating parts like this is to avoid an unintentional disconnection between the connectors 11 and 12, for instance due to dropping the telephone and the effect of inertia giving such an undesired result. The choice of =30° is based on the fact that it is most unlikely that the flip 6 of the telephone 1 is at this position when dropped. It is much more likely that it is either fully open or fully closed. Thus a reliable contact between the two connectors 11, 12 can be upheld in spite of an event as described. Another reason for this arrangement is that the two knobs 17 also function as stop means for the connector 11 during replacement of the flip 6. It is evident that the position =30° in this case should be avoided.

As mentioned above, the connector 11 co-rotates with the flip 6, which in essence means that the pivotal movement of the flip is taken up by the piece of wiring 10, which obviously must be designed to endure this pivotal movement during the lifetime of the rest of the components of the telephone 1. As an alternative the piece of wiring 10 may in an alternative embodiment be at least partly spirally wound to equalise the tension therein.

1. In connection with the flip 6 in FIG. 2, there is also shown parts of a locking arrangement 18 for the flip 6, which in the embodiment shown is to be automatically opened upon pressing a knob (not shown) to be situated on the side portion of the telephone at 19. The mechanism is however here neither shown nor described in its entirety.

What is claimed is:

1. Arrangement at a cellular mobile telephone apparatus, comprising:

a protective flip pivotably arranged on a housing of said apparatus including a microphone, said flip being pivotable around an axle through at least one ear of the flip and arranged to cover at least a part of the front side of the housing, said axle including hinge means at one end for providing a pivotable, mechanical connection between the flip and the housing as well as establishing an electrical connection between the microphone and the printed circuit board of the telephone along an axis of pivot for the flip, wherein the electrical connection between the microphone and a printed circuit board of the telephone housing is divided into a first wiring leading from the microphone to a first contacting means, fixedly arranged in the ear of the flip, and a second contacting means fixedly connectable to the first contacting means, and pivotably arranged along the axle of the housing, and from the end of the second contacting means on the inside of the housing, a second wiring leading from the second contacting means to the printed circuit board of the telephone.

2. Arrangement according to claim 1, wherein the microphone is flex-film soldered to the first wiring.

3. Arrangement according to claim 2, wherein the first contacting means is included into a flex-film soldered unit also containing the microphone and the first wiring.

4. Arrangement according to claim 2, wherein the second contacting means is pivotably arranged in an indentation designed in the housing.

5. Arrangement according to claim 4, wherein the second contacting means has two knobs extending in radial directions perpendicular to the axle.

6. Arrangement according to claim 5, wherein the knobs on the contacting means have counterparts in the housing of the telephone to allow the second contacting means to penetrate the bottom of the indentation of the housing.

7. Arrangement according to claim 6, wherein the knobs are diametrically separated and are allowed to penetrate the indentation at an angle of approximately 30° with regard to a plane parallel to the rear-side plane of the telephone in its assembled state.

8. Arrangement according to claim 1, wherein the second wiring at its end opposite to the second contacting means is attached to the printed circuit board via a disconnectable contact means.

9. Arrangement according to claim 1, wherein the second wiring is freely translatable within its extension limits.

10. Arrangement according to claim 1, wherein the second wiring is at least partly spirally wound.

11. An arrangement in a mobile radio, comprising:

a flip member including:

two opposing ears at one end for pivotally coupling the flip member to a housing about an axis running through the two ears;

a microphone;

a first connector fixedly arranged in one of the ears;

a first conductor coupled to the microphone at one end and to the first connector at the other end, the housing including:

electronic circuitry for processing signals from the microphone;

a second conductor coupled at one end to the electronic circuitry an axial compartment insertable between the two ears and having a hole at one end such that the flip member is rotatable about the axial compartment;

a second connector rotatable arranged in the hole at the one end of the axial compartment and fixedly connectable via the hole to the first connector to electrically couple the first and second conductors such that when the first and second connectors are connected, the first and second connectors are non-rotatable with respect to each other.

12. The arrangement in claim 11, wherein when the flip member is rotated about the axis, the first connector fixedly arranged in the one ear rotates along with the flip member causing the fixedly connected second connector to rotate together with the first connector.

13. The arrangement in claim 11, wherein rotation of the first connector when connected to the second connector causes the second conductor to twist.

14. Arrangement according to claim 11, wherein the microphone is flex-film soldered to the first conductor.

15. The Arrangement according to claim 11, wherein the second conductor is attached to the electronic circuitry via a disconnectable contact means.

16. The arrangement according to claim 11, wherein the second conductor is freely translatable when the flip member is rotated.

17. The arrangement according to claim 11, wherein the second conductor is at least partly spirally wound.

18. The arrangement according to claim 17, wherein a surface of the hole of the axial compartment includes a corresponding groove for each of the knobs to allow the second connector to penetrate the hole of the axial compartment.

19. The arrangement according to claim 11, wherein the second connector includes two knobs extending in radial directions perpendicular to the axis.

20. Arrangement according to claim 19, wherein the knobs are diametrically separated and are allowed to penetrate the hole at an angle of approximately 30° with regard to a plane parallel to the housing.

* * * * *